June 25, 1929.  H. M. SABEY ET AL  1,718,439
MACHINE FOR APPLYING PAINT TO CANVAS AND THE LIKE
Filed Feb. 24, 1928  6 Sheets-Sheet 1
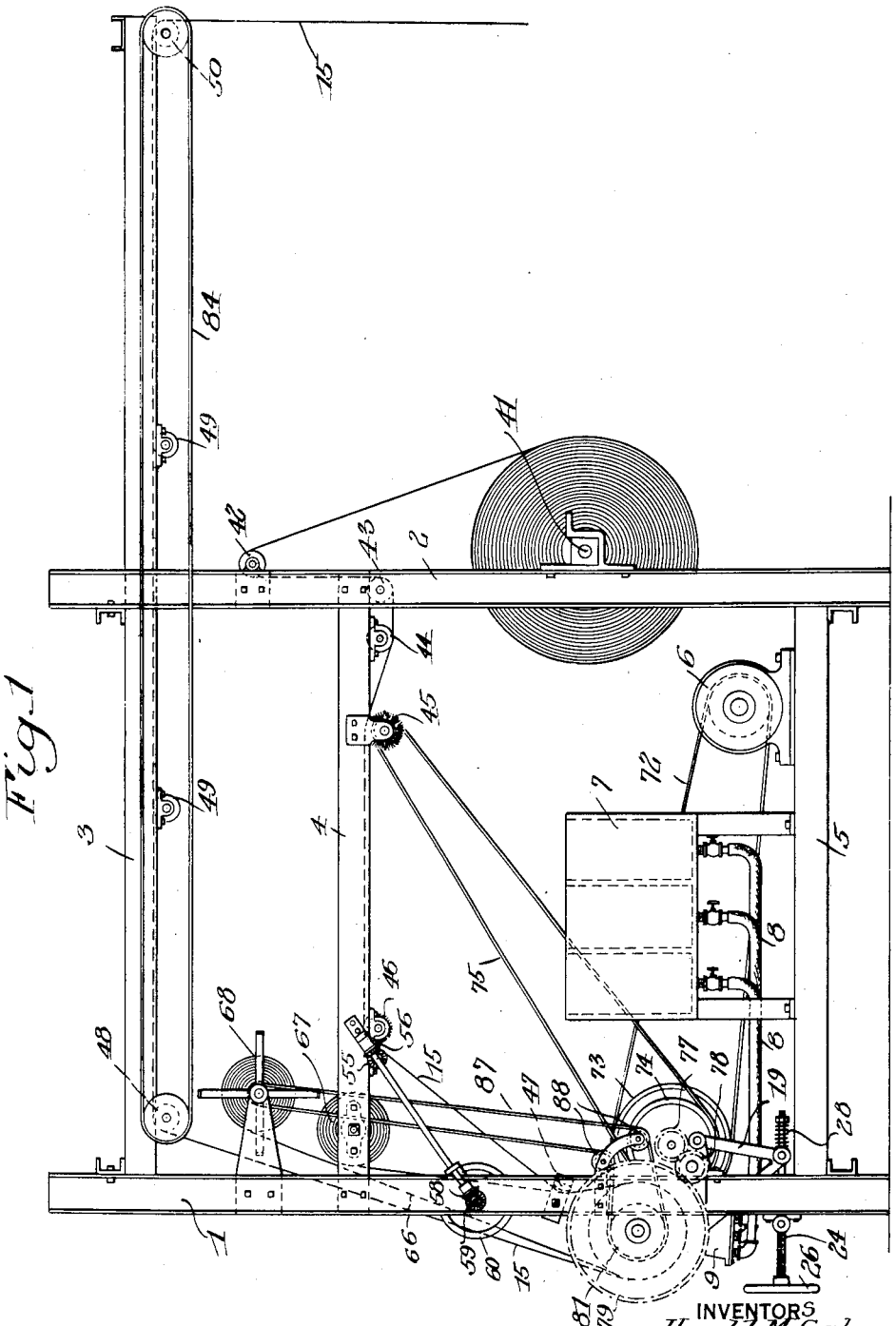
INVENTORS
Harold M. Sabey
Frank J. Aldridge
BY Harold E. Stonebraker
Their ATTORNEY

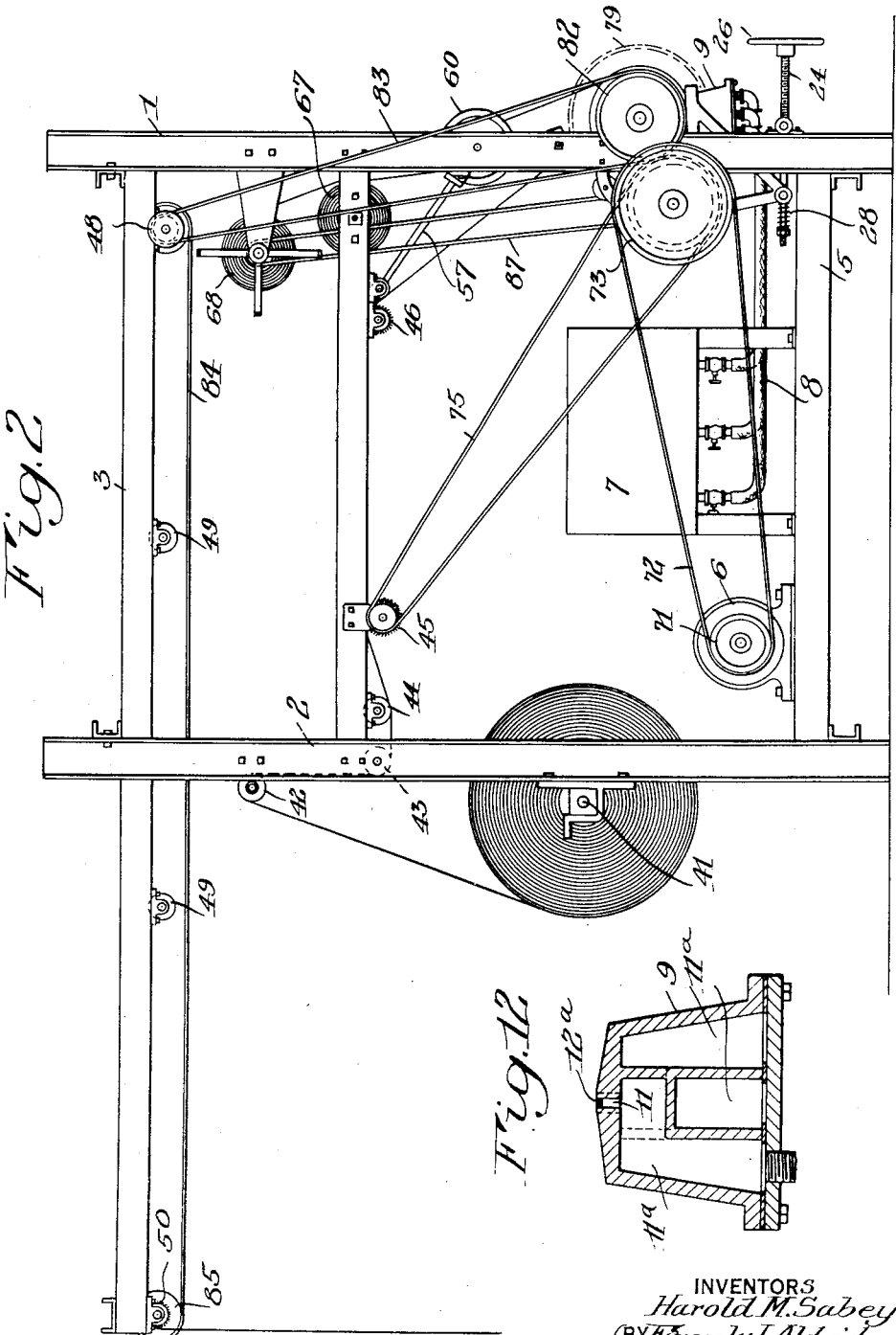

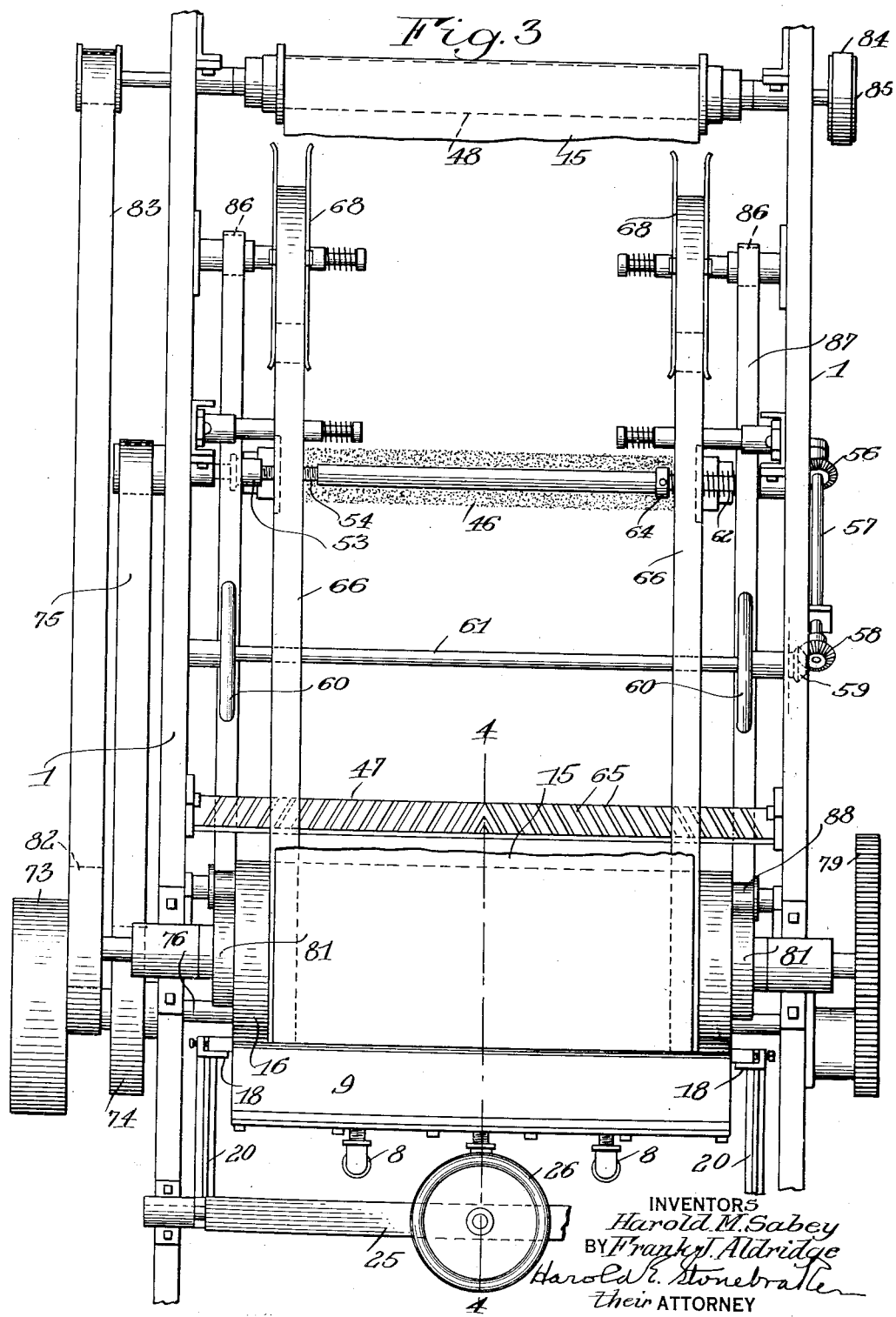

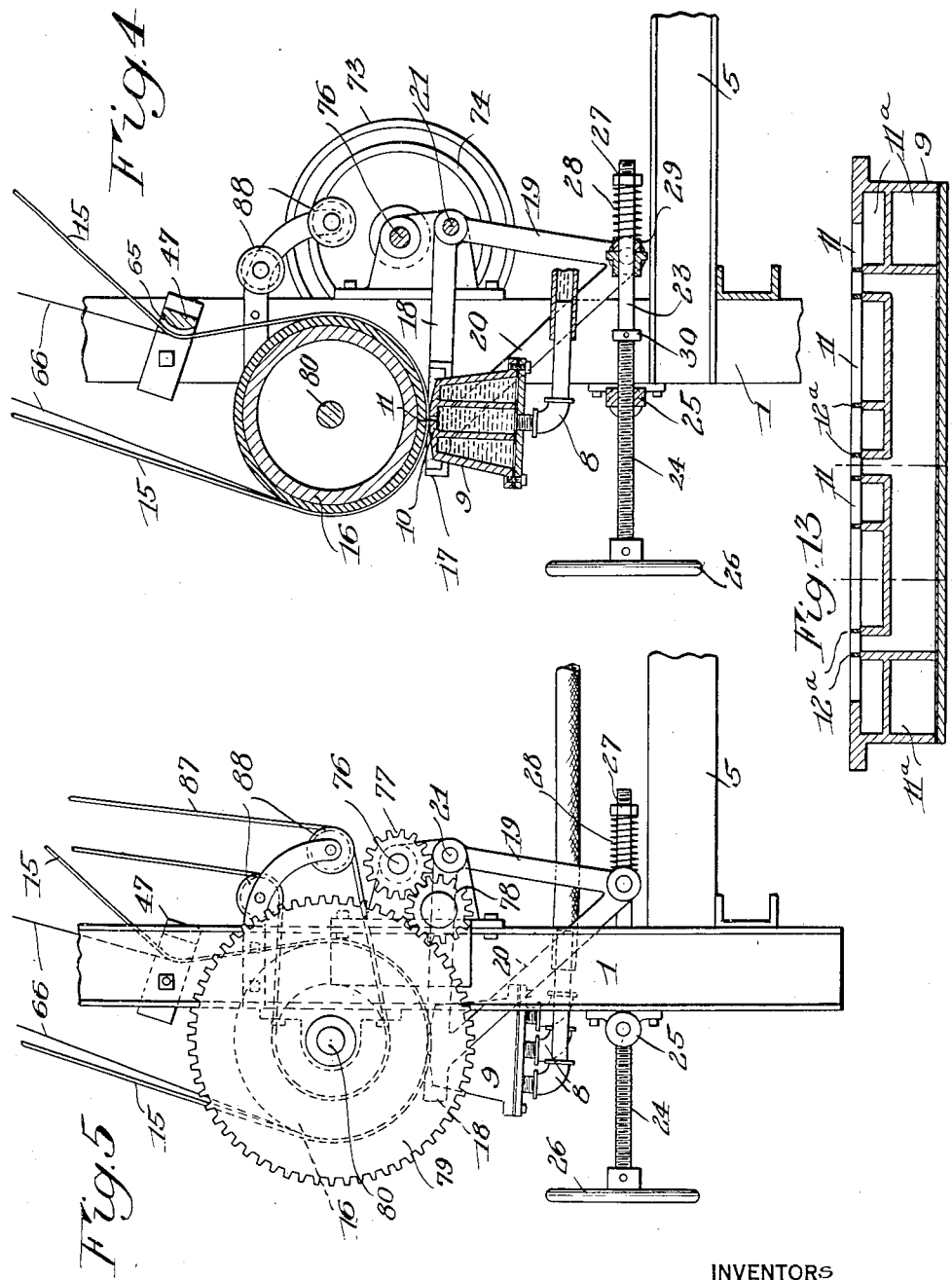

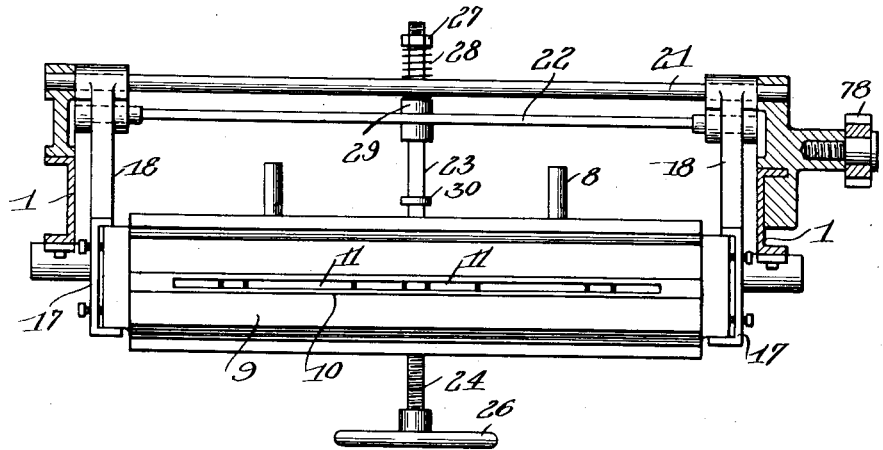
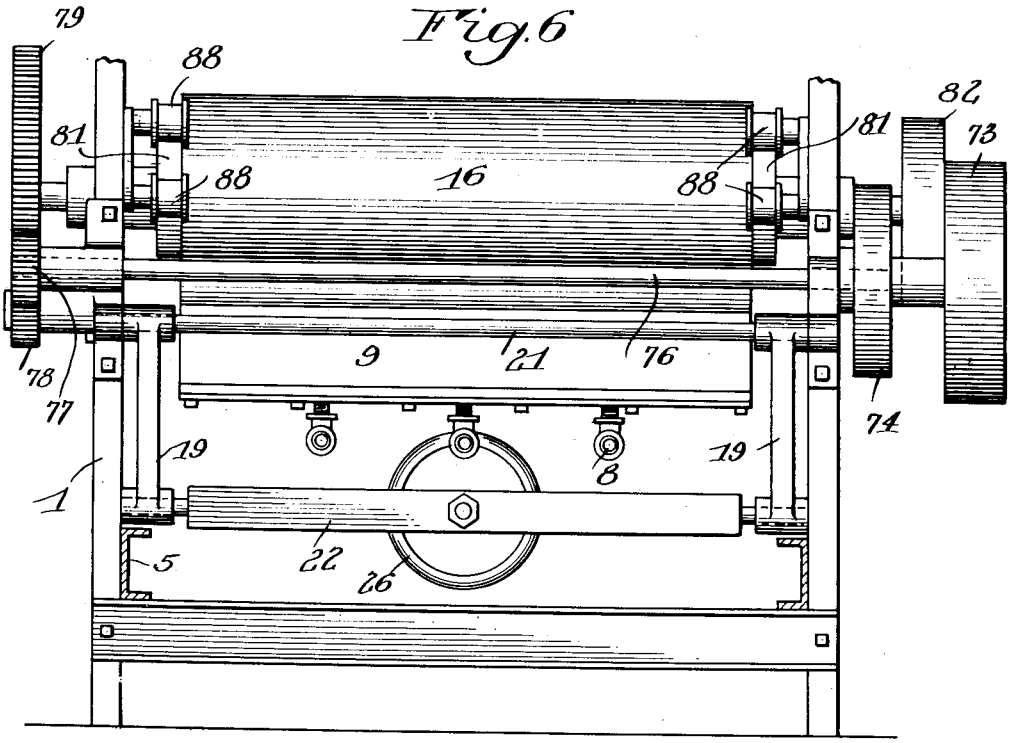

June 25, 1929.  H. M. SABEY ET AL  1,718,439
MACHINE FOR APPLYING PAINT TO CANVAS AND THE LIKE
Filed Feb. 24, 1928   6 Sheets-Sheet 6
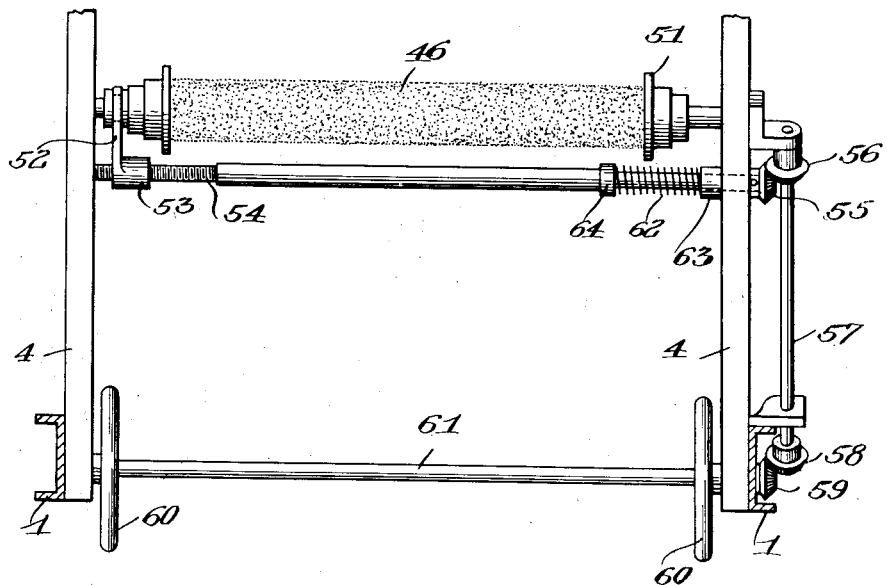
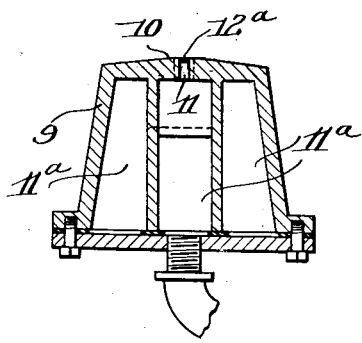
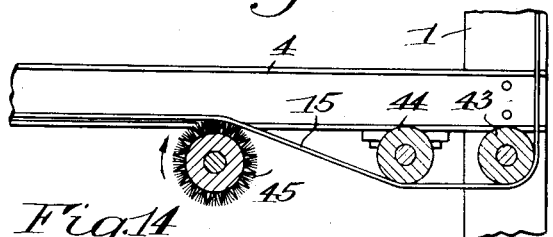
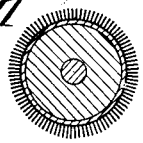
INVENTORS
Harold M. Sabey
Frank J. Aldridge
BY Harold R. Stonebraker
their ATTORNEY Patented June 25, 1929.

1,718,439

UNITED STATES PATENT OFFICE.

HAROLD M. SABEY, OF ROCHESTER, AND FRANK J. ALDRIDGE, OF HONEOYE FALLS, NEW YORK, ASSIGNORS TO THE DUBAN SHADE CORPORATION, OF ROCHESTER, NEW YORK, A CORPORATION OF NEW YORK.

MACHINE FOR APPLYING PAINT TO CANVAS AND THE LIKE.

Application filed February 24, 1928. Serial No. 256,689.

This invention relates to a machine for painting sheet material, and has reference more particularly to mechanism for painting stripes on canvas, such as used for awnings, and similarly ornamenting other material of a like character.

The object of the invention is to afford a practicable and efficient mechanism that is easily operated and will accurately apply paint to a continuously moving sheet of material so as to imprint thereon a series of stripes of different colors arranged adjacently with clear cut divisions between the different colors and without overlapping or smearing.

A further purpose of the invention is to afford a mechanism so constructed as to offer little resistance and minimum friction to the canvas or other work sheet as it is fed past the point where the paint is applied thereto.

Another purpose of the improvement is to provide a paint applying means that permits of applying differently colored stripes on a sheet from paint openings arranged in alinement with each other, such differently colored stripes being sharply defined, in adjacent relation but without overlap or blurring of the edges of the stripes.

Still an additional object of the invention is to provide means for protecting the unpainted side of a work sheet when fed by a roll and preventing access of paint to such unpainted side or to the part of the feeding roll located between the edges of the sheet.

To these and other ends, the invention comprehends the structure and arrangement that will appear clearly from the following description when read in conjunction with the accompanying drawings, the novel features being pointed out in the claims following the description.

In the drawings:

Figure 1 is a side elevation of an apparatus constructed in accordance with one embodiment of the invention;

Figure 2 is a side elevation taken opposite to Figure 1;

Figure 3 is an end elevation with parts broken away;

Figure 4 is a vertical sectional view on the line 4—4 of Figure 3;

Figure 5 is an enlarged side elevation looking in the same direction as Figure 4;

Figure 6 is a view in elevation looking from the right to the left of Figure 5;

Figure 7 is a horizontal sectional view with the feeding roll removed and showing the paint applying means;

Figure 8 is an enlarged plan view of the positioning roll and adjusting means therefor;

Figure 9 is an enlarged vertical sectional view through the paint chamber and bed through which the paint is applied;

Figure 10 is a detail sectional view illustrative of the sheet cleaning means;

Figure 11 is a detail sectional view of the sheet positioning roll;

Figure 12 is another transverse sectional view of the paint chamber;

Figure 13 is a longitudinal sectional view of the paint chamber; and

Figure 14 is a perspective view of one of the partitions in the paint bed.

The structure shown is intended for painting stripes on canvas, such as used in the manufacture of awnings, although it may be practically applied for a variety of uses, and in the drawings to which detailed reference will now be made, there is a frame comprising front uprights 1, rear uprights 2, top rails 3, intermediate supporting rails 4, and bottom rails 5 upon which are suitably mounted the electric driving motor 6 and paint supply tank 7, see Figures 1 and 2.

The paint tank 7 is preferably divided into several compartments for holding differently colored paints, said compartments communicating through flexible or other pipes 8 with a paint chamber 9 having corresponding compartments, see Figure 4. The paint chamber 9 forms part of the paint applying means and terminates in a narrow bed 10, preferably concave, and located beneath the work feeding roll. The bed 10 is provided with openings 11 extending toward the sheet feeding roll and operating to apply paint to the adjacent surface of the work sheet as it is fed past the bed 10. The paint tank 7 is so located that the paint feeds by gravity to the chamber 9 and through the openings 11 to the work sheet, although other means may be utilized for bringing the paint to the point of application.

Referring to Figures 7 and 13, the paint openings 11 are arranged in juxtarelation to one another and in alinement, each group of openings communicating with a separate compartment 11a in the paint chamber. The structure shown provides for three different colors, although additional colors may be used by adding more paint compartments. The paint openings are separated by partitions which terminate in sharply tapered extremities 12a, see Figure 14, resulting in a fine sharp line of division between different colors. The edges of the tapered portions 12a, which extend transversely of the paint openings, are adapted to engage the surface of the work and permit differently colored stripes to be applied adjacently to one another and without any overlap or smearing of the edges of the separate colors, owing to the narrowness of the paint bed which is engaged by any given surface of the work through a very brief interval.

Paint is thus applied to the under surface of the work sheet 15 as the latter travels past the bed 10 around the rotating feeding roll 16, see Figure 4, and to accomplish this, the paint chamber and bed 10 are held against the feeding roll by yieldable means, the tension of which is adjustable with the mechanism that will now be described.

The paint chamber 9 and bed 10 comprising the paint applying means are mounted in holders 17 which are mounted on or form a part of triangular frames including top rails 18, vertical arms 19, and inclined portions 20, said frames being pivoted on the rod 21, see Figures 4 and 7. Connecting the lower portions of the triangular frames just described, and pivotally associated therewith is a cross bar 22 through which extends an adjusting post 23 having a threaded portion 24 engaging a stationary nut 25 and a hand adjusting wheel 26 for turning the post. At the opposite end of the post is a nut 27, while 28 is a spring located between the nut 27 and a collar 29 adjacent to the cross bar 22. It will be seen that the paint applying means is held upwardly against the work feeding roll by the post 23 through the spring 28 which exerts yieldable pressure through the triangular frames that support the paint chambers. By turning the hand wheel 26 in one direction or the other, the spring 28 can be compressed or released so as to adjust the degree of pressure with which the bed 10 is held against the work feeding roll. 30 is a collar fixed on the post 23 to limit forward movement of the adjusting post.

The work sheet of canvas or other material, designated at 15, is fed from a roll on a reel or spindle 41, see Figures 1 and 2, and passes thence over suitable guide rolls 42, 43 and 44, from which it passes into engagement with a cleaning brush 45 that travels in the opposite direction to the work sheet and thoroughly cleans the surface to which paint is to be applied. Thence the work sheet passes into engagement with a positioning roll 46 that will be described presently in more detail, from which it travels over a spreader or smoothing bar 47 to the feeding roll already mentioned. While in contact with the feeding roll, the painting operation takes place and the work sheet then passes upwardly and around a guide roll 48 and over the supporting rolls 49 around guide roll 50, whence it is taken off and suitably festooned on the floor or otherwise handled until the paint is dry.

The positioning roll, shown in Figure 8, which is surfaced with carding cloth or other suitable means for engaging the work sheet, includes shoulders or flanges 51 between which the work sheet is positioned, and in order to adjust this positioning roll laterally to obtain the desired position for the work sheet, the roll 46 has connected therewith an arm 52 carrying a nut 53 that engages a threaded adjusting post 54. At one end of the latter is a bevel pinion 55 engaged by a second bevel pinion 56 on the shaft 57 which is operated through bevel pinions 58 and 59 from the hand wheel 60 on the shaft 61. 62 is a spring mounted between a fixed collar 63 and a collar 64 carried by the shaft 54 and serving as frictional means to hold the shaft 54 and with it the positioning roll 46 in adjusted position. The smoothing or supporting bar 47 already mentioned, and which appears in Figures 1, 3 and 4, is a stationary convex bar over which the work sheet travels and is grooved in opposite directions from the center, as indicated at 65, Figure 3, and causes the work sheet to be uniformly smoothed or spread out from the center toward both edges immediately before it passes to the feeding roll.

In order to protect the reverse side of the work sheet and prevent paint from reaching the surface of the feed roll 16 or that portion thereof between the edges of the work sheet, guard strips 66 are employed which travel under the edges of the work sheet 15, as shown in Figure 3. The guard strips 16 of any desirable material are fed from rolls 67 downwardly over the smoothing bar 47 and around the feeding roll 16, thence upwardly to a point where they are wound on the rolls 68 that are driven in a manner that will now be described.

The armature shaft of motor 6 carries a pulley 71 which drives a belt 72, the latter engaging a pulley 73. Pulley 73 is mounted on a shaft which carries a second pulley 74 from which a belt 75 drives a pulley on the shaft upon which the aforementioned brush 45 is mounted. The pulleys 73 and 74 are mounted upon a shaft 76 to which is also fixed a pinion 77, see Figure 5, engaging an idler gear 78 which engages and drives a gear wheel 79 mounted on the shaft 80 upon which the feed roll 16 is mounted. The shaft 80 has fixed thereto pulleys 81, see Figure 1, and 82, see Figure 2. From pulley 82, a belt 83 leads to a pulley on the shaft which carries the guide roll 48, while 84 is a belt leading from the last mentioned pulley to pulley 85 for operating the guide roll 50. The reel 68 upon which the protecting strips 66 are wound are frictionally mounted on shafts which carry pulleys 86, see Figure 3, that are engaged and driven by the belts 87 which travel around the guide pulleys 88 and are driven by the aforementioned pulleys 81.

The chief features of the invention are the structure that permits applying differently colored stripes from openings in a single line, permitting the use of a narrow bed, and resulting in adjacently arranged stripes of different colors separated by sharp clear lines, and the use of a roll to feed the work and hold it against the paint bed.

While the invention has been described with reference to a particular embodiment herein disclosed, the several improvements are not confined to the precise structure described, and this application is intended to cover any modifications or other adaptations coming within the intent of the improvements or the scope of the following claims.

We claim:

1. The combination with a work support, of paint applying means comprising a paint chamber having a series of paint outlets arranged in juxtaposed endwise relation to each other and in alinement, of transverse partitions between said paint outlets terminating in sharply tapered edges adapted to contact with the work and permit the application of different colors upon a sheet adjacent to each other.

2. The combination with a work feeding roll, of paint applying means comprising a paint chamber terminating in a narrow concave bed in juxtarelation to the feeding roll, said bed having paint outlets in juxtaposed endwise relationship and in alinement with each other, and transverse partitions between said openings terminating in sharply tapered edges adapted to contact with the work and permit the application of different colors upon a sheet adjacent to each other.

3. The combination with paint applying means comprising a paint chamber having a series of outlets arranged in endwise juxtaposed relationship and in alinement with each other, of means for feeding a sheet of material past said openings while holding it in close relation thereto, and transverse partitions separating the several paint openings and terminating in sharply tapered edges arranged to contact with the work and permit the application of different colors on a sheet adjacent to each other.

4. The combination with paint applying means comprising a paint chamber terminating in a narrow bed having a series of openings therein arranged in juxtaposed endwise relationship and in alinement with each other, of means for feeding a sheet of material past said openings while holding it in close relation thereto, and transverse partitions separating said openings and terminating in sharply tapered edges arranged to contact with the work and permit the application of different colors on a sheet adjacent to each other.

5. The combination with a work feeding roll, of a paint chamber beneath the roll terminating in a bed in juxtarelation to the roll and having openings extending toward the roll, means for applying paint through said openings to the adjacent surface of a sheet of material as it travels between the roll and the bed, and adjustable means for yieldingly holding the bed against the roll.

6. The combination with a work feeding roll, of a paint chamber beneath the roll terminating in a bed in juxtarelation to the roll and having openings extending toward the roll, means for applying paint through said openings to the adjacent surface of a sheet of material as it travels between the roll and the bed, a gravity supply tank in communication with said paint chamber, and adjustable means for yieldingly holding the bed against the roll.

7. The combination with a work feeding roll, of a paint chamber located beneath the roll and terminating in a bed in juxtarelation to the roll and having openings extending toward the same, yieldable means for holding the bed against the roll, and a gravity supply tank communicating with said chamber.

In witness whereof, we have hereunto signed our names.

HAROLD M. SABEY.
FRANK J. ALDRIDGE.